United States Patent
Pequeno et al.

(10) Patent No.: US 8,742,041 B2
(45) Date of Patent: Jun. 3, 2014

(54) PROCESSES FOR THE POLYMERIZATION OF OLEFINS WITH EXTRACTED METAL CARBOXYLATE SALTS

(75) Inventors: R. Eric Pequeno, Baytown, TX (US); Fathi David Hussein, Cross Lanes, WV (US); Kevin Joseph Cann, Rocky Hill, NJ (US); Chi-I Kuo, Humble, TX (US); Bruce Jon Savatsky, Kingwood, TX (US); Eric J. Markel, Kingwood, TX (US); Daniel Paul Zilker, Jr., Charleston, WV (US); Agapios Kyriacos Agapiou, Humble, TX (US); David M. Glowczwski, Baytown, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 13/988,956

(22) PCT Filed: Nov. 10, 2011

(86) PCT No.: PCT/US2011/060198
§ 371 (c)(1),
(2), (4) Date: May 22, 2013

(87) PCT Pub. No.: WO2012/074709
PCT Pub. Date: Jun. 7, 2012

(65) Prior Publication Data
US 2013/0253153 A1 Sep. 26, 2013

Related U.S. Application Data

(60) Provisional application No. 61/418,069, filed on Nov. 30, 2010.

(51) Int. Cl.
*C08F 4/602* (2006.01)
*C08F 4/642* (2006.01)
*C08F 4/6592* (2006.01)
*C08F 10/00* (2006.01)
*C08F 4/646* (2006.01)
*C08F 4/659* (2006.01)

(52) U.S. Cl.
CPC ............. *C08F 4/642* (2013.01); *C08F 4/602* (2013.01); *C08F 4/6428* (2013.01); *C08F 4/646* (2013.01); *C08F 4/65904* (2013.01); *C08F 4/6592* (2013.01); *C08F 10/00* (2013.01); *Y10S 526/943* (2013.01)
USPC ........... 526/154; 526/160; 526/165; 526/348; 526/943

(58) Field of Classification Search
None
See application file for complete search history.

(56) References Cited

FOREIGN PATENT DOCUMENTS

| JP | 4359907 | 12/1992 |
|---|---|---|
| JP | 2008163188 | 7/2008 |
| WO | WO 2010/039948 A2 | 4/2010 |

*Primary Examiner* — Caixia Lu
(74) *Attorney, Agent, or Firm* — Jennifer A. Schmidt

(57) ABSTRACT

Processes for the polymerization of olefins with extracted metal carboxylate salts are provided. The polymerization processes have increased productivity and/or increased resin bulk density.

20 Claims, No Drawings

PROCESSES FOR THE POLYMERIZATION OF OLEFINS WITH EXTRACTED METAL CARBOXYLATE SALTS

CROSS-REFERENCE TO RELATED APPLICATIONS

This application is a National Stage application under 35 U.S.C. §371 of International Application No. PCT/US2011/060198, filed Nov. 10, 2011, that claims the benefit of Ser. No. 61/418,069, filed Nov. 30, 2010, the disclosures of which are incorporated by reference in their entireties.

BACKGROUND

Metallocene catalysts are widely used to produce polyolefin polymers such as polyethylene polymers. They have provided efficient processes and a variety of new and improved polymers. However, there is continued focus in the industry on developing new and improved metallocene catalyst compositions. Some have focused on designing the catalyst compositions to produce new polymers, others on improved operability, and yet others on improving catalyst productivity. The productivity of a catalyst, that is, the amount of polymer produced per gram of the catalyst, can be an important concern for polyolefin producers. Reactor operability (e.g., lack of fouling and sheeting, etc. of the polymerization reactor) is another major concern for polyolefin producers. Reducing the occurrence of reactor fouling has commercial benefits in reduced down time for the reactor and improved output of polyolefin resin, as well as higher quality resin.

In order to address reactor fouling problems, other additives such as metal carboxylate salts are often added to the catalyst, either separately or as part of the supported catalyst composition. However, such additives can suppress catalyst productivity and resin bulk density.

Thus, it would be advantageous to have an improved polymerization process that utilizes metal carboxylate salts to address reactor fouling problems, for example, without having undesirable suppression of catalyst productivity and resin bulk density.

SUMMARY

Disclosed herein are processes for the polymerization of olefins with extracted metal carboxylate salts. The processes may be characterized by having increased catalyst productivity and/or increased resin bulk density. The polymerization process may comprise polymerizing an olefin in a reactor in the presence of a catalyst composition and an extracted metal carboxylate salt, wherein the extracted metal carboxylate salt was produced by extraction of a metal carboxylate salt with an organic solvent having a dielectric constant of greater than or equal to 3.0 at 25° C. The extracted metal carboxylate salt may be added to the reactor together with the catalyst composition or separately from the catalyst composition.

Also provided is a polymerization process for the production of an ethylene alpha-olefin copolymer having increased catalyst productivity and/or increased resin bulk density, the polymerization process comprising contacting ethylene and an alpha-olefin with a catalyst composition in a reactor under polymerization conditions to produce the ethylene alpha-olefin copolymer, wherein the catalyst composition comprises a polymerization catalyst and a first extracted metal carboxylate salt, wherein the first extracted metal carboxylate salt was produced by extraction of a metal carboxylate salt with an organic solvent having a dielectric constant of greater than or equal to 3.0 at 25° C. The process may further comprise adding a continuity additive comprising a second extracted metal carboxylate salt into the reactor, wherein the second extracted metal carboxylate salt and the catalyst composition are added to the reactor separately, wherein the second extracted metal carboxylate salt was produced by extraction of a metal carboxylate salt with an organic solvent having a dielectric constant of greater than or equal to 3.0 at 25° C.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

Disclosed herein are processes for the polymerization of olefins having increased catalyst productivity and/or increased resin bulk density. Particular processes disclosed include those directed to polymerization of olefins in the presence of a metallocene catalyst compound and an extracted metal carboxylate salt. In some embodiments, the metal carboxylate salt and the metallocene catalyst compound may be added to the reactor separately. Also disclosed herein are catalyst compositions comprising the metallocene catalyst compound and the extracted metal carboxylate salt, the catalyst composition having increased catalyst productivity. Also disclosed herein are metallocene catalyst compounds that have been produced by the incipient wetness technique. Additionally disclosed are methods of making the catalyst composition and polymer products produced by the polymerization process.

In several of the embodiments disclosed herein, it has been discovered that using an extracted metal carboxylate salt in combination with a catalyst compound results in increased catalyst productivity. In addition, it has further been discovered that using the extracted metal carboxylate salt in combination with the catalyst compound can also result in higher resin bulk densities. Higher resin bulk densities may be advantageous for a number of reasons, including higher plant rates and higher monomer efficiency (e.g., less ethylene vented to flare) with ensuing environmental credits for reduced ethylene emissions. Even further, it has been discovered that increased catalyst productivity may also be obtained by using metallocene catalyst compounds that have been produced by incipient wetness impregnation.

Extracted Metal Carboxylate Salts

Extracted metal carboxylate salts may be used in the polymerization of olefins as described herein. The extracted metal carboxylate salt may be produced by extracting a metal carboxylate salt with an organic solvent having a dielectric constant of greater than or equal to 3.0 at 25° C. As used herein, the term "metal carboxylate salt" refers to any mono- or di- or tri-carboxylic acid salt with a metal portion from the Periodic Table of Elements. Without being bound by theory, it is believed that extraction of the metal carboxylate salt reduces or potentially even eliminates free carboxylic acids or derivatives thereof, which usually residually remain after synthesis of the metal carboxylate salt. It is believed that reduced catalyst productivity and resin bulk densities that result from the use of metal carboxylates salts with metallocene catalysts are due, at least in part, to the fraction of free carboxylic acid or Group 1 or Group 2 salts thereof present in the metal carboxylate salt.

In certain embodiments, the extracted metal carboxylate salt is substantially free of free carboxylic acids. As used herein, the term "substantially free of free carboxylic acids" refers to an extracted metal carboxylate salt which does not show a melting point which corresponds to the free acid or a Group 1 or Group 2 salt thereof in the DSC analysis thereof. The extracted metal carboxylate salt may have less than or equal to about 1 wt % of total free acid based on the total weight of the extracted metal carboxylate salt as determined chromatographically, or less than or equal to about 0.5 wt %, or less than or equal to about 0.1 wt % of total free acid based on the total weight of the extracted metal carboxylate salt.

The extracted metal carboxylate salt may be produced by extracting a metal carboxylate salt with an organic solvent having a dielectric constant of greater than or equal to 3.0 at 25° C. This polar solvent results in an improved extraction of the polar compounds including the free acids present in the crude metal carboxylate salt. Examples of suitable organic solvents include $C_1$-$C_{10}$ alcohols, $C_1$-$C_{10}$ ketones, $C_1$-$C_{10}$ esters, $C_1$-$C_{10}$ ethers, $C_1$-$C_{10}$ alkyl halides, $C_1$-$C_{10}$ alkylonitriles, $C_1$-$C_{10}$ dialkyl sulfoxides, and combinations thereof. In another embodiment, the organic solvent is selected from methanol, ethanol, propanol, isopropanol, butanol, acetone, methyl-ethyl ketone, methyl acetate, ethyl acetate, methyl propionate, methyl buterate, dimethyl ether, diethyl ether, 1,4-dioxane, tetrahydrofuran, chloroform, dichloromethane, acetonitrile, dimethyl sulfoxide, and combinations thereof.

The dielectric constant of a solvent is defined by $\in$ in the equation:

$$F=(QQ')/(\in r^2)$$

where F is the force of attraction between two charges Q and Q' separated by a distance r in the solvent. The dielectric constants of many solvents are well known and can be found, for example, in the CRC Handbook of Chemistry and Physics $59^{th}$ Edition on pages E-55 to E-62.

Preferred solvents have a dielectric constant at 25° C. of greater than or equal to 3, or greater than or equal to 5, or greater than or equal to 7, or greater than or equal to 10, or greater than or equal to 12, or greater than or equal to 15, or greater than or equal to 17. In some embodiments, the solvent may have a dielectric constant at 25° C. of at least 20.

Non-limiting examples of metal carboxylic salts which can be used as the precursor for the extracted metal carboxylate salts include saturated, unsaturated, aliphatic, aromatic or saturated cyclic carboxylic acid salts. Examples of the carboxylate ligand include, but are not limited to, acetate, propionate, butyrate, valerate, pivalate, caproate, isobuytlacetate, t-butyl-acetate, caprylate, heptanate, pelargonate, undecanoate, oleate, octoate, palmitate, myristate, margarate, stearate, arachate and tercosanoate. Non-limiting examples of the metal portion includes a metal from the Periodic Table of Elements selected from the group of Al, Mg, Ca, Sr, Sn, Ti, V, Ba, Zn, Cd, Hg, Mn, Fe, Co, Ni, Pd, Li and Na.

The metal carboxylate salt may be represented by the following general formula:

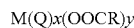

$$M(Q)x(OOCR)y$$

wherein M is a metal from Group 3 to 16 and the Lanthanide and Actinide series, alternatively from Groups 8 to 13, alternatively from Group 13 with aluminum being one specific example; Q is halogen, hydrogen, a hydroxy or hydroxide, alkyl, alkoxy, aryloxy, siloxy, silane or sulfonate group R is a hydrocarbyl radical having from 1 to 100 carbon atoms; and x is an integer from 0 to 3 and y is an integer from 1 to 4 and the sum of x and y is equal to the valence of the metal.

R in the above formula may be the same or different. Non-limiting examples of R include hydrocarbyl radicals having 2 to 100 carbon atoms that include alkyl, aryl, aromatic, aliphatic, cyclic, saturated or unsaturated hydrocarbyl radicals. In some embodiments, R is a hydrocarbyl radical having greater than or equal to 8 carbon atoms, or greater than or equal to 12 carbon atoms, or greater than 14 carbon atoms. In other embodiments, R may comprise a hydrocarbyl radical having from 17 to 90 carbon atoms, or from 17 to 72 carbon atoms, or from 17 to 54 carbon atoms. In other embodiments, R comprises 6 to 30 carbon atoms, or 8 to 24 carbon atoms, or 16 to 18 carbon atoms (e.g., plamityl and stearyl).

Non-limiting examples of Q in the above formula include one or more, same or different, hydrocarbon containing groups such as alkyl, cycloalkyl, aryl, alkenyl, arylalkyl, arylalkenyl or alkylaryl, alkylsilane, arylsilane, alkylamine, arylamine, alkyl phosphide, alkoxy, having from 1 to 30 carbon atoms. The hydrocarbon containing group may be linear, branched, or even substituted. Q may also be an inorganic group such as a halide, sulfate or phosphate.

The metal carboxylate salts may comprise aluminum carboxylates such as aluminum mono, di- and tri-stearates, aluminum octoates, oleates and cyclohexylbutyrates. For example, the metal carboxylate salt may comprise $(CH_3(CH_2)_{16}COO)_3$ Al, an aluminum tri-stearate, $(CH_3(CH_2)_{16}COO)_2$—Al—OH, an aluminum di-stearate, and/or an $CH_3(CH_2)_{16}COO$—Al(OH)$_2$, an aluminum mono-stearate. Other examples of metal carboxylate salts include titanium stearates, tin stearates, calcium stearates, zinc stearates, boron stearate, and strontium stearates.

The extracted metal carboxylate salt may be used as a part of the catalyst composition and/or introduced directly into the reactor independently of the catalyst composition. For example, the extracted metal carboxylate salt and the catalyst composition may be fed to the reactor separately.

The amount of the extracted metal carboxylate salt added to the reactor system may depend upon the catalyst system used, as well as reactor pre-conditioning (such as reactor wall coatings to control static buildup) and other factors known to those skilled in the art, such as the conditions, temperature and pressure of the reactor, the type of mixing apparatus, the quantities of the components to be combined, and even the mechanism for introducing the catalyst/continuity additive combination into the reactor. In some embodiments, the ratio of the amount of the extracted metal carboxylate salt to the amount of polymer produced in the reactor at a given time may be between about 0.5 ppm and about 1000 ppm, or between about 1 ppm and about 400 ppm, or between about 5 ppm and about 50 ppm.

The extracted metal carboxylate salt may be fed to polymerization reactors as a solution or as a slurry. For example, the extracted metal carboxylate salt may be initially admixed or combined with mineral oil, forming a slurry that may be fed to the reactor.

The extracted metal carboxylate salt and the catalyst composition may be co-injected into the reactor. For example, the catalyst may be unsupported in a liquid form, such as described in U.S. Pat. Nos. 5,317,036 and 5,693,727 and European publication EP-A-0 593 083. The catalyst in liquid form may be fed with the extracted metal carboxylate salt to a reactor using the injection methods described, for example, in WO 97/46599.

In some embodiments, a catalyst compound may be contacted with the extracted metal carboxylate salt to make the catalyst composition. It is understood that contacting may also refer to combining, blending, mixing, or the like.

The extracted metal carboxylate salt may be present in the catalyst composition at from about 0.1 to about 25 wt %. Within this range, the extracted metal carboxylate salt may be present in the catalyst composition at greater than or equal to 0.5%, or greater than or equal to 1%, or greater than or equal to 2%, or greater than or equal to 3%, or greater than or equal to 4%, or greater than or equal to 5%, or greater than or equal to 6%, or greater than or equal to 7%, or greater than or equal to 8%, or greater than or equal to 9%, or greater than or equal to 10%, based on the total weight of the catalyst composition. Also within this range, the extracted metal carboxylate salt may be present in the catalyst composition in an amount less than or equal to 20%, or less than or equal to 15%, or less than or equal to 10%, based on the total weight of the catalyst composition.

In some embodiments, a metallocene catalyst, optionally with another catalyst, is combined, contacted, blended, and/or mixed with the extracted metal carboxylate salt. The catalyst may be supported. Embodiments may include forming a catalyst, such as forming a supported catalyst, and contacting the catalyst with the extracted metal carboxylate salt. In some embodiments, the supported catalyst may be formed by include incipient wetness impregnation or another technique for depositing the catalyst compound on the support.

In some embodiments, a supported metallocene catalyst is tumbled with the extracted metal carboxylate salt for a period of time such that a substantial portion of the supported catalyst is mixed and/or substantially contacted with the extracted metal carboxylate salt. The extracted metal carboxylate salt may also be pre-mixed with a cocatalyst or activator such as, an organo metallic compound, such as, methylalumoxane or modified methylalumoxane, before being introduced into the reactor.

In some embodiments, the catalyst composition is supported and may be substantially dried, preformed, and/or free flowing. The preformed supported catalyst composition is contacted with the extracted metal carboxylate salt. The extracted metal carboxylate salt may be in solution, emulsion, or slurry. It may also be in a solid form such as free flowing powder. In another embodiment, the extracted metal carboxylate salt is contacted with a supported catalyst composition, for example, a supported metallocene catalyst composition, in a rotary mixer, such as a tumble mixer, under a nitrogen atmosphere or in a fluidized bed mixing process.

In some embodiments, a metallocene catalyst is contacted with a support to form a supported catalyst compound. An activator for the catalyst compound may be contacted with a separate support to form a supported activator. The extracted metal carboxylate salt may then be mixed with the supported catalyst compound or the supported activator, in any order, separately mixed, simultaneously mixed, or mixed with only one of the supported catalyst, or, for example, the supported activator prior to mixing the separately supported catalyst and activator.

Mixing or contacting techniques may involve any mechanical mixing means, for example shaking, stirring, tumbling, and rolling. Another technique contemplated involves the use of fluidization, for example, in a fluid bed reactor vessel where circulated gases provide the contacting.

Additional Continuity Additives/Aids

In addition to the extracted metal carboxylate salts described above, it may also be desirable to use one or more additional continuity additives to, for example, aid in regulating static levels in the reactors. As used herein, the term "continuity additive or aid" and "antifoulant agent" refer to compounds or mixtures of compounds, such as solids or liquids, that are useful in gas phase or slurry phase polymerization processes to reduce or eliminate fouling of the reactor, where "fouling" may be manifested by any number of phenomena including sheeting of the reactor walls, plugging of inlet and outlet lines, formation of large agglomerates, or other forms of reactor upsets known in the art. For purposes herein, the terms may be used interchangeably. The continuity additive may be used as a part of the catalyst composition or introduced directly into the reactor independently of the catalyst composition. In some embodiments, the continuity additive is supported on the inorganic oxide of the supported catalyst composition described herein.

Non-limiting examples of continuity additives include fatty acid amines, amide-hydrocarbon or ethyoxylated-amide compounds such as described as "surface modifiers" in WO 96/11961; carboxylate compounds such as aryl-carboxylates and long chain hydrocarbon carboxylates, and fatty acid-metal complexes; alcohols, ethers, sulfate compounds, metal oxides and other compounds known in the art. Some specific examples of continuity additives include 1,2-diether organic compounds, magnesium oxide, ARMOSTAT 310, ATMER 163, ATMER AS-990, and other glycerol esters, ethoxylated amines (e.g., N,N-bis(2-hydroxyethyl)octadecylamine), alkyl sulfonates, and alkoxylated fatty acid esters; STADIS 450 and 425, KEROSTAT CE 4009 and KEROSTAT CE 5009. chromium N-oleylanthranilate salts, calcium salts of a Medialan acid and di-tert-butylphenol; POLYFLO 130, TOLAD 511 (a-olefin-acrylonitrile copolymer and polymeric polyamine), EDENOL D32, sorbitan-monooleate, glycerol monostearate, methyl toluate, dimethyl maleate, dimethyl furnarate, triethylamine, 3,3-diphenyl-3-(imidazol-1-yl)-propin, and like compounds. In some embodiments, the additional continuity additive is a metal carboxylate salt as described, optionally, with other compounds as described in this section.

Any of the aforementioned additional continuity additives may be employed either alone or in combination as an additional continuity additive. For example, the extracted metal carboxylate salt may be combined with an amine containing control agent (e.g., an extracted carboxylate metal salt with any family member belonging to the KEMAMINE (available from Chemtura Corporation) or ATMER (available from ICI Americas Inc.) family of products). For example, the extracted metal carboxylate salt may be combined with antistatic agents such as fatty amines, such as, KEMAMINE AS 990/2 zinc additive, a blend of ethoxylated stearyl amine and zinc stearate, or KEMAMINE AS 990/3, a blend of ethoxylated stearyl amine, zinc stearate and octadecyl-3,5-di-tert-butyl-4-hydroxyhydrocinnamate.

Other additional continuity additives useful in embodiments disclosed herein are well known to those in the art. Regardless of which additional continuity additives are used, care should be exercised in selecting an appropriate additional continuity additive to avoid introduction of poisons into the reactor. In addition, in selected embodiments, the smallest amount of the additional continuity additives necessary to bring the static charge into alignment with the desired range should be used.

The additional continuity additives may be added to the reactor as a combination of two or more of the above listed additional continuity additives, or a combination of an additional continuity additive and the extracted carboxylate metal salt. The additional continuity additive(s) may be added to the reactor in the form of a solution or a slurry, such as a slurry with a mineral oil, and may be added to the reactor as an individual feed stream or may be combined with other feeds prior to addition to the reactor. For example, the additional continuity additive may be combined with the catalyst or catalyst slurry prior to feeding the combined catalyst-static control agent mixture to the reactor.

In some embodiments, the additional continuity additives may be added to the reactor in an amount ranging from about 0.05 to about 200 ppmw, or from about 2 to about 100 ppmw, or from about 2 to about 50 ppmw, based on the polymer production rate. In some embodiments, the additional continuity additives may be added to the reactor in an amount of about 2 ppmw or greater, based on the polymer production rate.

Metallocene Catalysts

The catalyst composition may include at least one metallocene catalyst component. As used herein, the term "catalyst composition" may refer to the catalyst, for example, metallocene catalyst as described herein, and/or at least one co-catalyst sometimes called an activator, with optional components, such as supports, additives, continuity additives/aids or scavengers.

The metallocene catalyst or metallocene component may include "half sandwich," (i.e., at least one ligand) and "full sandwich," (i.e., at least two ligands) compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocene(s)" or "metallocene catalyst component(s)."

The one or more metallocene catalyst components are represented by the formula (I):

$$Cp^A Cp^B MX_n \qquad (I)$$

The metal atom "M" of the metallocene catalyst compound, as described throughout the specification and claims, may be selected from the group consisting of Groups 3 through 12 atoms and lanthanide Group atoms in one embodiment; and selected from the group consisting of Groups 4, 5 and 6 atoms in yet a more particular embodiment, and a Ti, Zr, Hf atoms in yet a more particular embodiment, and Zr in yet a more particular embodiment. The groups bound the metal atom "M" is such that the compounds described below in the formulas and structures are neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

In some embodiments, M is as described above; each X is chemically bonded to M; each Cp group is chemically bonded to M; and n is 0 or an integer from 1 to 4, or 1, or 2.

The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in structure (I) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

Non-limiting examples of alkyl substituents R associated with formula (I) include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In some embodiments, at least two R groups, such as two adjacent R groups, are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each X in formula (I) is independently selected from the group consisting of: halogen ions, hydrides, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In some embodiments, X may be selected from $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons, and substituted derivatives thereof. In some embodiments, X is selected from hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls, and fluorophenyls. I some embodiments X may be selected from $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls. In some embodiments X is selected from chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls. In some embodiments X is selected from fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls).

The metallocene catalyst compound and/or component may include those of formula (I) where $Cp^A$ and $Cp^B$ are bridged to each other by at least one bridging group, (A), such that the structure is represented by formula (II):

$$Cp^A(A)Cp^BMX_n \qquad (II)$$

These bridged compounds represented by formula (II) are known as "bridged metallocenes." $Cp^A$, $Cp^B$, M, X and n are as defined above for formula (I); and wherein each Cp ligand is chemically bonded to M, and (A) is chemically bonded to each Cp. Non-limiting examples of bridging group (A) include divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, divalent thioethers. Additional non-limiting examples of bridging group A include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above for formula (I) including halogen radicals and iron. More particular non-limiting examples of bridging group (A) are represented by $C_1$ to $C_6$ alkylenes, substituted $C_1$ to $C_6$ alkylenes, oxygen, sulfur,  (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In some embodiments, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In some embodiments, bridging group (A) may also be cyclic, comprising, for example 4 to 10, 5 to 7 ring members in a more particular embodiment. The ring members may be selected from the elements mentioned above, from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents are selected from the group consisting of hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group consisting of those having 4 to 10, more particularly 5, 6 or 7 ring members (selected from the group consisting of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formula (I) and (II) are different from each other in one embodiment, and the same in another embodiment.

In yet another aspect, the metallocene catalyst components include mono-ligand metallocene compounds (e.g., mono cyclopentadienyl catalyst components) such as described in WO 93/08221 for example which is incorporated herein by reference.

In yet another aspect, the at least one metallocene catalyst component is an unbridged "half sandwich" metallocene represented by the formula (III):

$$Cp^4MQ_qX_n \qquad (III)$$

wherein $Cp^4$ is defined as for the Cp groups in (I) and is a ligand that is bonded to M; each Q is independently bonded to M; Q is also bound to $Cp^4$ in one embodiment; X is a leaving group as described above in (I); n ranges from 0 to 3, and is 1 or 2 in one embodiment; q ranges from 0 to 3, and is 1 or 2 in one embodiment. In one embodiment, $Cp^4$ is selected from the group consisting of cyclopentadienyl, indenyl, tetrahydroindenyl, fluorenyl, substituted version thereof, and combinations thereof.

In formula (III), Q is selected from the group consisting of $ROO^-$, $RO$—, $R(O)$—, —$NR$—, —$CR_2$—, —$S$—, —$NR_2$, —$CR_3$, —$SR$, —$SiR_3$, —$PR_2$, —H, and substituted and unsubstituted aryl groups, wherein R is selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. Alternatively, R is selected from $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in formula (II), such as described in, for example, U.S. Pat. No. 6,069,213:

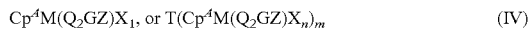
$$Cp^4M(Q_2GZ)X_1, \text{ or } T(Cp^4M(Q_2GZ)X_n)_m \qquad (IV)$$

wherein M, $Cp^4$, X and n are as defined above;

$Q_2GZ$ forms a polydentate ligand unit (e.g., pivalate), wherein at least one of the Q groups form a bond with M, and is defined such that each Q is independently selected from the group consisting of —O—, —NR—, —$CR_2$— and —S—; G is either carbon or silicon; and Z is selected from the group consisting of R, —OR, —$NR_2$, —$CR_3$, —SR, —$SiR_3$, —$PR_2$, and hydride, providing that when Q is —NR—, then Z is selected from the group consisting of —OR, —$NR_2$, —SR, —$SiR_3$, —$PR_2$; and provided that neutral valency for Q is satisfied by Z; and wherein each R is independently selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

In some embodiments, R is selected from the group consisting of $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys; n is 1 or 2; T is a bridging group selected from the group consisting of $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; wherein each T group bridges adjacent "$Cp^4M(Q_2GZ)X_n$" groups, and is chemically bonded to the $Cp^4$ groups; and m is an integer from 1 to 7 or from 2 to 6.

A as described above for (A) in structure (II), may be selected from the group consisting of a chemical bond, —O—, —S—, $SO_2$, NR—, —$SiR_2$, =$GeR_2$, =$SnR_2$, —$R_2SiSiR_2$—, RP=, $C_1$ to $C_{12}$ alkylenes, substituted $C_1$ to $C_{12}$ alkylenes, divalent $C_4$ to $C_{12}$ cyclic hydrocarbons and substituted and unsubstituted aryl groups in one embodiment; and selected from the group consisting of $C_5$ to $C_8$ cyclic hydrocarbons, —$CH_2CH_2$—, =$CR_2$ and =$SiR_2$ in a more particular embodiment; wherein and R is selected from the group consisting of alkyls, cycloalkyls, aryls, alkoxys, fluoroalkyls and heteroatom-containing hydrocarbons in one embodiment; and R is selected from the group consisting of $C_1$ to $C_6$ alkyls, substituted phenyls, phenyl, and $C_1$ to $C_6$ alkoxys in a more particular embodiment; and R is selected from the group consisting of methoxy, methyl, phenoxy, and phenyl in yet a more particular embodiment; wherein A may be absent in yet another embodiment, in which case each R* is defined as for $R^1$-$R^{13}$; each X is as described above in (I); n is an integer from 0 to 4, and from 1 to 3 in another embodiment, and 1 or 2 in yet another embodiment; and $R^1$ through $R^{13}$ are independently: selected from the group consisting of hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos through $R^{13}$ may also be selected independently from $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in one embodiment; selected from the group consisting of hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, $C_7$ to $C_{18}$ fluoroalkylaryls in a more particular embodiment; and hydrogen radical, fluorine radical, chlorine radical, methyl, ethyl, propyl, isopropyl, butyl, isobutyl, tertiary butyl, hexyl, phenyl, 2,6-di-methylpheyl, and 4-tertiarybutylpheyl groups in yet a more particular embodiment; wherein adjacent R groups may form a ring, either saturated, partially saturated, or completely saturated.

It is contemplated that the metallocene catalysts components described above include their structural or optical or enantiomeric isomers (racemic mixture), and may be a pure enantiomer in one embodiment.

As used herein, a single, bridged, asymmetrically substituted metallocene catalyst component having a racemic and/or meso isomer does not, itself, constitute at least two different bridged, metallocene catalyst components.

The "metallocene catalyst compound", also referred to herein as the metallocene catalyst component" may comprise any combination of any "embodiment" described herein.

Other suitable metallocenes include but are not limited to those described in U.S. Pat. Nos. 7,179,876, 7,169,864, 7,157,531, 7,129,302, 6,995,109, 6,958,306, 6,884748, 6,689,847, 6,309,997, 6,265,338, U.S. Pat. App. Pub. No. 2007/0055028, and U.S. Pat. App. Pub. No. 2006/019925, and published PCT App. Nos. WO 97/22635, WO 00/699/22, WO 01/30860, WO 01/30861, WO 02/46246, WO 02/50088, WO 04/026921, WO 06/019494, and WO 2010/039948.

Conventional Catalysts and Mixed Catalysts

The catalyst composition may include one or more metallocene catalysts as described above and/or other conventional polyolefin catalysts, as well as Group 15 atom containing catalysts described below.

"Group 15 atom containing" catalysts or "Group 15-containing" catalysts may include complexes of Group 3 to 12 metal atoms, wherein the metal atom is 2 to 8 coordinate, the coordinating moiety or moieties including at least two Group 15 atoms, and up to four Group 15 atoms. For example, the Group 15-containing catalyst component may be a complex of a Group 4 metal and from one to four ligands such that the Group 4 metal is at least 2 coordinate, the coordinating moiety or moieties including at least two nitrogens. Representative Group 15-containing compounds are disclosed in, for example, WO99/01460, EPA10893454, U.S. Pat. Nos. 5,318, 935, 5,889,128, 6,333,389B2, and 6,271,325B1.

In an embodiment, the Group 15-containing catalyst components may include Group 4 imino-phenol complexes, Group 4 bis(amide) complexes, and Group 4 pyridyl-amide complexes that are active towards olefin polymerization to any extent. In one possible embodiment, the Group 15-containing catalyst component may include a bisamide compound such as [(2,3,4,5,6Me5C6)NCH2CH2]2NHZrBz2 (from Boulder Chemical).

Activators and Activation Methods for Catalyst Compounds

Embodiments of the catalyst compositions may further comprise an activator. An "activator," as used herein, is defined in a broad sense as any combination of reagents that increases the rate at which a transition metal compound oligomerizes or polymerizes unsaturated monomers, such as olefins.

In some embodiments, the activator is a Lewis-base, such as for example, diethyl ether, dimethyl ether, ethanol, or methanol. Other activators that may be used include those described in WO 98/07515 such as tris(2,2',2"-nonafluorobiphenyl) fluoroaluminate.

Combinations of activators may be used. For example, alumoxanes and ionizing activators may be used in combinations, see for example, EP-B10 573 120, WO 94/07928 and WO 95/14044 and U.S. Pat. Nos. 5,153,157 and 5,453,410. WO 98/09996 describes activating metallocene catalyst compounds with perchlorates, periodates and iodates including their hydrates. WO 98/30602 and WO 98/30603 describe the use of lithium (2,2'-bisphenyl-ditrimethylsilicate). 4THF as an activator for a metallocene catalyst compound. WO 99/18135 describes the use of organo-boron-aluminum activators. EP-B1-0 781 299 describes using a silylium salt in combination with a non-coordinating compatible anion. WO 2007/024773 suggests the use of activator-supports which may comprise a chemically-treated solid oxide, clay mineral, silicate mineral, or any combination thereof. Also, methods of activation such as using radiation (see EP-B1-0 615 981), electro-chemical oxidation, and the like are also contemplated as activating methods for the purposes of rendering the neutral metallocene catalyst compound or precursor to a metallocene cation capable of polymerizing olefins. Other activators or methods for activating a metallocene catalyst compound are described in, for example, U.S. Pat. Nos. 5,849, 852, 5,859,653 and 5,869,723 and PCT WO 98/32775.

In some embodiments, alumoxanes may be utilized as an activator in the catalyst composition. Alumoxanes are generally oligomeric compounds containing —Al(R)—O—subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1 and WO 94/10180.

Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in, for example, U.S. Pat. Nos. 4,665, 208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, WO 94/10180 and WO 99/15534. In an embodiment, a visually clear methylalumoxane may be used. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, disclosed in U.S. Pat. No. 5,041,584).

In some embodiments, an ionizing or stoichiometric activator, neutral or ionic, such as tri(n-butyl) ammonium tetrakis (pentafluorophenyl) boron, a trisperfluorophenyl boron metalloid precursor or a trisperfluoronaphtyl boron metalloid precursor, polyhalogenated heteroborane anions (see, for example, WO 98/43983), boric acid (see, for example, U.S. Pat. No. 5,942,459) or combinations thereof, may be used. The neutral or ionic activators may be used alone or in combination with alumoxane or modified alumoxane activators.

Examples of neutral stoichiometric activators may include tri-substituted boron, tellurium, aluminum, gallium and indium or mixtures thereof. The three substituent groups may be each independently selected from the group of alkyls, alkenyls, halogen, substituted alkyls, aryls, arylhalides, alkoxy and halides. In embodiments, the three substituent groups may be independently selected from the group of halogen, mono or multicyclic (including halosubstituted) aryls, alkyls, and alkenyl compounds and mixtures thereof; in a class of embodiments are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternatively, the three groups are alkyls having 1 to 4 carbon groups, phenyl, napthyl or mixtures thereof. In other embodiments, the three groups are halogenated, in an embodiment fluorinated, aryl groups. In yet other illustrative embodiments, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in, for example, European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124.

Methods for Supporting Catalyst Compounds/Activators

The above described catalyst compounds may be combined with one or more supports using one of the support methods well known in the art or as described below. For example, in the catalyst compound may be used in a supported form, such as, deposited on, contacted with, or incorporated within, adsorbed or absorbed in, or on the support.

As used herein, the term "support" refers to compounds comprising Group 2, 3, 4, 5, 13 and 14 oxides and chlorides. Suitable supports include, for example, silica, magnesia, titania, zirconia, montmorillonite, phyllosilicate, alumina, silica-alumina, silica-chromium, silica-titania, magnesium chloride, graphite, magnesia, titania, zirconia, montmorillonite, and phyllosilicate.

The support may possess an average particle size in the range of from about 0.1 to about 50 μm, or from about 1 to about 40 μm, or from about 5 to about 40 μm.

The support may have an average pore size in the range of from about 10 to about 1000 Å, or about 50 to about 500 Å, or 75 to about 350 Å. In some embodiments, the average pore size of the support is from about 1 to about 50 μm.

The support may have a surface area in the range of from about 10 to about 700 m$^2$/g, or from about 50 to about 500 m$^2$/g, or from about 100 to about 400 m$^2$/g.

The support may have a pore volume in the range of from about 0.1 to about 4.0 cc/g, or from about 0.5 to about 3.5 cc/g, or from about 0.8 to about 3.0 cc/g.

The support may have an average particle size in the range of from about 1 to about 500 μm, or from about 10 to about 200 μm, or from about 5 to about 100 μm.

The support, such as an inorganic oxide, may have a surface area in the range of from about 10 to about 700 m2/g, a pore volume in the range of from about 0.1 to about 4.0 cc/g, and an average particle size in the range of from about 1 to about 500 μm. Alternatively, the support may have a surface area in the range of from about 50 to about 500 m2/g, a pore volume of from about 0.5 to about 3.5 cc/g, and an average particle size of from about 10 to about 200 μm. In some embodiments, the surface area of the support is in the range is from about 100 to about 400 m2/g and the support has a pore volume of from about 0.8 to about 3.0 cc/g and an average particle size of from about 5 to about 100 μm.

The catalyst compounds may be supported on the same or separate supports together with an activator, or the activator may be used in an unsupported form, or may be deposited on a support different from the supported catalyst compound.

There are various other methods in the art for supporting a polymerization catalyst compound. For example, the catalyst compound may contain a polymer bound ligand as described in, for example, U.S. Pat. Nos. 5,473,202 and 5,770,755; the catalyst may be spray dried as described in, for example, U.S. Pat. No. 5,648,310; the support used with the catalyst may be functionalized as described in European publication EP-A-0 802 203, or at least one substituent or leaving group is selected as described in U.S. Pat. No. 5,688,880.

In some embodiments, incipient wetness impregnation may be used for combining the catalyst compounds with the one or more support materials. Incipient wetness impregnation may result in the catalyst compositions having increased catalyst productivity as compared to other techniques for catalyst preparation.

Incipient wetness impregnation may include dissolving one or more components of the catalyst composition (e.g., the catalyst compound, the activator, etc.) in a solvent. The volume of the mixture of the one or more catalyst components can vary depending, for example, on the particular catalyst composition being produced. To impregnate the support with the one or more catalyst components, the mixture may then combined with the support in accordance with present embodiments. A particular factor of importance in the impregnation is the pore volume of the support. In particular, the volume of the mixture of the one or more catalyst components should be sufficient to fill the pore volume of the support without forming a slurry of the mixture and the support. In one embodiment, the volume of the mixture does not exceed about 120% of the pore volume of the support, or does not exceed about 110% of the pore volume of the support, or does not exceed about 105% of the pore volume of the support. In some embodiments, the volume of the mixture is substantially same as the pore volume of the support.

The solvent may then be removed from the impregnated pores of the support. For example, the solvent may be removed from the support by heating and/or by vacuum. In some embodiments, the positive pressure for the vacuum may be induced by an inert gas, such as nitrogen. It should be understood that heating of the impregnated support should be controlled to reduce and/or prevent undesired agglomeration of catalyst particle and/or crosslinking of any activator that may be used.

Solvents for use in incipient wetness impregnation may include, for example, solvents in which the metallocene catalyst and/or the activator are at least partially soluble. Non-limiting examples of suitable solvents include aromatic hydrocarbons, halogenated aromatic hydrocarbons, ethers, cyclic ethers or esters. Specific examples of suitable solvents may include THF (tetrahydrofuran), dichloromethane, pentane, cyclopentane, hexane, cyclohexane, benzene, toluene, diethyl ether, di-n-butyl ether, 1,4-dioxane, and combinations thereof.

Polymerization Processes

Embodiments of the polymerization processes may include polymerization of olefins in the presence of a metallocene catalyst compound and an extracted metal carboxylate salt. Polymerization processes may include solution, gas phase, slurry phase, a high pressure process, or a combination thereof. In illustrative embodiments, a gas phase or slurry phase polymerization of one or more olefins at least one of which is ethylene or propylene is provided.

The catalysts and catalyst compositions described above may be suitable for use in any prepolymerization and/or polymerization process over a wide range of temperatures and pressures. The temperatures, for example, may be in the range of from about 60° C. to about 280° C., or from about 50° C. to about 200° C., or from about 60° C. to about 120° C., or from about 70° C. to about 100° C., or from about 80° C. to about 95° C., wherein a desirable temperature range may include any combination of any upper limit with any lower limit described herein.

The one or more olefin monomers used in the polymerization process may have from 2 to 30 carbon atoms, or 2 to 12 carbon atoms, or 2 to 8 carbon atoms. For example, the polymerization process may use two or more olefins or comonomers such as ethylene, propylene, 1-butene, 1-pentene, 4-methyl-1-pentene, 1-hexene, 1-octene, 1-decene, or the like.

A copolymer of ethylene may be produced in the polymerization process, where ethylene is polymerized with an alpha-olefin comonomer having from 4 to 15 carbon atoms, or from 4 to 12 carbon atoms, or from 4 to 8 carbon atoms.

Typically in a gas phase polymerization process a continuous cycle is employed where in one part of the cycle of a reactor system, a cycling gas stream, otherwise known as a recycle stream or fluidizing medium is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228.

The reactor pressure in a gas phase process may vary, for example, from about atmospheric pressure to about 600 psig, or from about 100 psig (690 kPa) to about 500 psig (3448 kPa), or from about 200 psig (1379 kPa) to about 400 psig (2759 kPa), or from about 250 psig (1724 kPa) to about 350 psig (2414 kPa).

The reactor temperature in a gas phase process may vary, for example, from about 30° C. to about 120° C., or from about 60° C. to about 115° C., or from about 70° C. to about 110° C., or from about 70° C. to about 95° C.

Other gas phase processes contemplated include those described in U.S. Pat. Nos. 5,627,242, 5,665,818 and 5,677,375, and European publications EP-A-0 794 200, EP-A-0 802 202, EP-A2 0 891 990 and EP-B-634 421.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. In an embodiment, a hexane or an isobutane medium is employed. Examples of solution and slurry phase polymerization processes include those described in U.S. Pat. Nos. 3,248,179, 4,613,484, 4,271,060, 5,001,205, 5,236,998 and 5,589,555.

Polymer Products

The polymers produced by the processes described herein can be used in a wide variety of products and end-use applications. The polymers produced may include, but are not limited to, linear low density polyethylene, low density polyethylenes, and high density polyethylenes.

The polymers may have a density, for example, in the range of from about 0.86 $g/cm^3$ to about 0.97 $g/cm^3$, or in the range of from about 0.88 $g/cm^3$ to about 0.965 $g/cm^3$, or in the range of from about 0.900 $g/cm^3$ to about 0.96 $g/cm^3$.

The polymers may have a molecular weight distribution (a weight average molecular weight to number average molecular weight (Mw/Mn)), for example, of greater than 1.5 to about 15, or greater than 2 to about 10, or greater than about 2.2 to less than about 8.

The polymers may have a melt index (MI) or (I2), as measured by ASTM-D-1238-E (190/2.16), for example, in the range from 0.01 dg/min to 1000 dg/min, or from about 0.01 dg/min to about 100 dg/min, or from about 0.1 dg/min to about 100 dg/min.

The polymers may have a melt index ratio (I21/I2) (I21 is measured by ASTM-D-1238-F, [190/21.6]), for example, of from 5 to 300 in, or from about 10 to less than 250, or from 15 to 200, or from 20 to 180.

Polymers produced by the processes disclosed herein and blends of such polymer with other polymers may be useful in such forming operations as film, pipe, sheet, and fiber extrusion and co-extrusion as well as blow molding, injection molding and rotary molding.

EXAMPLES

The following examples are put forth so as to provide those skilled in the art with a complete disclosure and description of how to make and use the compounds of the invention, and are not intended to limit the scope of that which the inventors regard as their invention.

The following catalyst compounds and continuity additives were used in the Examples.

Continuity Additive 1

Continuity Additive 1 ("CA-1") was a mixture of a hydroxyethyl stearylamine (25-50 wt %) and a metal carboxylate salt (50-75 wt %). The metal carboxylate salt was an aluminum stearate, available from Chemtura Corporation, Memphis, Tenn. The aluminum stearate had an ash content of about 11-12 wt %, a moisture content of about 0.5 wt %, and a free fatty acid content of about 3-4 wt %. CA-1 was used as a slurry in mineral oil.

Continuity Additive 2

Continuity Additive 2 ("CA-2") was a metal carboxylate salt prepared via extraction with acetone. The aluminum stearate was extracted with acetone by combining the aluminum stearate with acetone with agitation. The acetone had a dielectric constant of 20.70 measured at 25° C. The weight ratio of acetone to aluminum stearate was approximately 6:1. After combination, the acetone was then removed, and the extracted aluminum stearate was dried, sieved, and weighed to determine the amount of material removed via the extraction. In this extraction, 3-4 wt % of solubles were removed via the extraction. CA-2 was used as a slurry in mineral oil.

Continuity Additive 3

Continuity Additive 3 ("CA-3") was a metal carboxylate salt prepared via extraction with methanol. The aluminum stearate was extracted with methanol by combining the aluminum stearate with methanol with agitation. The methanol had a dielectric constant of 32.63 at 25° C. The weight ratio of methanol to aluminum stearate was approximately 6:1. After combination, the methanol was then removed, and the extracted aluminum stearate was dried, sieved, and weighed to determine the amount of material removed via the extraction. In this extraction, 4-6 wt % of soluble were removed via the extraction. CA-3 was used as a slurry in mineral oil.

Catalyst A

The metallocene catalyst compound in Catalyst A was a bis(n-propyl-cyclopentadieny)hafniumdimethyl ((n-propyl Cp)$_2$HfMe$_2$) metallocene available from Boulder Scientific Company, USA. The catalyst compound was supported on ES757 grade silica dehydrated in air at 875° C., having approximately 0.4 weight percent water Loss on Ignition (LOI). LOI is measured by determining the weight loss of the support material which has been heated and held at a temperature of about 1000° C. for about 22 hours. The ES757 silica has an average particle size of 25 microns and is available from PQ Corporation.

The first step in the manufacture of the metallocene-type catalyst above involves forming a precursor solution. 2.2 lbs (1 kg) of sparged and dried toluene was added to an agitated reactor after which 2.34 lbs (1.06 kg) of a 30 weight percent methylaluminoxane (MAO) in toluene (available from Albemarle, Baton Rouge, La.) was added. 0.205 lbs (93 g) of a 24.7 weight percent toluene solution of the (n-propyl Cp)$_2$HfMe$_2$ catalyst compound and 0.22 lbs (0.1 kg) of additional toluene were introduced into the reactor. The precursor solution is then stirred at 21.1° C. for one hour.

While stirring the above precursor solution, 1.87 lbs (0.85 kg) of 875° C. dehydrated silica carrier was added slowly to the precursor solution and the mixture agitated at 21.1° C. The reactor contents are then mixed for 60 min. while heating to 75° C. Vacuum was then applied and the polymerization catalyst mixture dried to a free flowing powder. The final polymerization catalyst weight was 2.65 lbs (1.2 kg) and had a Zr wt % of 0.8 and an Al wt % of 12.0.

Catalyst B

Catalyst B was a bridged, bulky ligand metallocene catalyst compound that has been formulated with aluminum stearate as part of the catalyst composition. The bridged, bulky ligand metallocene-type catalyst compound used was a dimethylsilyl-bis(tetrahydroindenyl)zirconium dichloride (Me$_2$Si(H$_4$Ind)$_2$ZrCl$_2$) metallocene available from Albemarle Corporation, Baton Rouge, La. The Me$_2$Si(H$_4$Ind)$_2$ZrCl$_2$ catalyst compound was supported on Crosfield ES-70 grade silica dehydrated at 600° C. having approximately 1.0 weight percent water Loss on Ignition (LOI). LOI was measured by determining the weight loss of the support material which has been heated and held at a temperature of about 1000° C. for about 22 hours. The Crosfield ES-70 grade silica has an average particle size of 40 microns and is available from Crosfield Limited, Warrington, England.

The first step in the manufacture of the supported bulky ligand metallocene-type catalyst above involves forming a precursor solution. 460 lbs (209 kg) of sparged and dried toluene was added to an agitated reactor after which 1060 lbs (482 kg) of a 30 weight percent methylaluminoxane (MAO) in toluene (available from Albemarle, Baton Rouge, La.) was added. 947 lbs (430 kg) of a 2 weight percent toluene solution of the Me$_2$Si(H$_4$Ind)$_2$ZrCl$_2$ catalyst compound and 600 lbs (272 kg) of additional toluene were introduced into the reactor. The precursor solution is then stirred at 80° F. to 100° F. (26.7° C. to 37.8° C.) for one hour.

While stirring the above precursor solution, 850 lbs (386 kg) of 600° C. Crosfield dehydrated silica carrier was added slowly to the precursor solution and the mixture agitated for 30 minutes at 80° F. to 100° F. (26.7 to 37.8° C.). At the end of the 30 minute agitation of the mixture, 240 lbs (109 kg) of a 10 weight percent toluene solution of N,N-bis(2-hydroxylethyl) octadecylamine ((C$_{18}$H$_{37}$N(CH$_2$CH$_2$OH)$_2$) available as Kemamine AS-990 from Witco Corporation, Memphis, Tenn., was added together with an additional 110 lbs (50 kg) of a toluene rinse and the reactor contents was then mixed for 30 minutes while heating to 175° F. (79° C.). After 30 min. vacuum was applied and the polymerization catalyst mixture dried at 175° F. (79° C.) for about 15 hours to a free flowing powder. The final polymerization catalyst weight was 1200 lbs (544 kg) and had a Zr wt % of 0.35 and an Al wt % of 12.0.

Catalyst C

A 1 kg sample of Catalyst B, prepared as described above, was weighed into a 3-liter glass flask under an inert atmosphere. 40 g of CA-1 was dried under vacuum at 85° C. and was added to the flask and the contents tumbled/mixed for 20 minutes at room temperature. The CA-1 appeared to be homogeneously dispersed throughout the catalyst particles.

Catalyst D

Catalyst D was a bridged, bulky ligand metallocene-type catalyst compound that had been formulated with extracted aluminum stearate as part of the catalyst composition. A 1-kg sample of Catalyst B, prepared as described above, was weighed into a 3-liter glass flask under an inert atmosphere. 40 g of CA-2, prepared as described above, was dried under vacuum at 85° C. and was added to the flask and the contents tumbled/mixed for 20 minutes at room temperature. The CA-2 appeared to be homogeneously dispersed throughout the catalyst particles.

Catalyst E

The metallocene catalyst compound used Catalyst E is a bis(n-propyl-cyclopentadieny)hafniumdimethyl available from Boulder Scientific Company, USA. The catalyst compound was deposited on the support using incipient wetness impregnation. The catalyst compound was supported on ES757 grade silica dehydrated at 875° C. ES757 grade silica has an average particle size of 25 microns and is available from PQ Corporation, USA.

The first step in the manufacture of the metallocene-type catalyst above involves forming a precursor solution. In a nitrogen drybox, 0.24 lbs (10.88 g) of bis(n-propyl-cyclopentadieny)hafniumdimethyl was added to a solution of 30 wt % of methylaluminoxane (MAO) in toluene (available from Albemarle Corporation, USA). The precursor solution was then stirred at ambient temperature for one hour. Next, 0.882 lbs (400 g) of ES757 silica dehydrated at 875° C. was poured into a stainless steel mixing bowl of a KitchenAid Blender. The wire whip was attached, and the silica was stirred at the lowest setting. While stirring the silica, the above precursor solution was slowly added to the silica over a 45-minute period. After the addition, the catalyst mixture was stirred for an addition one hour at ambient temperature. The catalyst mixture was then divided into two, 500-ml pear-shaped flasks. The flasks were attached to a rotary vaporizer, and the catalyst was dried under vacuum at 70° C.

Catlyst F

The metallocene catalyst compound used in Catalyst F is a bis(n-propyl-cyclopentadieny)hafniumdimethyl available from Boulder Scientific Company, USA. The catalyst compound was deposited on the support using incipient wetness impregnation. The metallocene-type catalyst was manufactured using a procedure similar to that described above for Catalyst E. However, rather than depositing the catalyst compound on ES757 silica, the catalyst compound was supported on 948 grade silica dehydrated at 600° C. The 948 grade silica has an average particle size of 55 microns and is available from WR Grace, USA.

Example 1

The following example relates to gas phase polymerization procedures carried out in a pilot plant fluidized bed reactor, utilizing ethylene and hexane comonomers. The reactor was used to evaluate the use of extracted metal carboxylates salts as a continuity additive. Table 1 identifies 3 different runs, along with the reported reaction conditions for each run. Also reported in Table 1 is the catalyst productivity. Table 2 identifies various properties of the resulting product, including the resin bulk density.

The polymerizations were conducted in a continuous gas phase fluidized bed reactor. Each run was operated using the same continuous gas phase fluidized reactor. The fluidized bed was made up of polymer granules. The gaseous feed streams of ethylene and hydrogen together with liquid comonomer were mixed together in a mixing tee arrangement and introduced below the reactor bed into the recycle gas line. Monomers of 1-hexene were used as the comonomer. The individual flow rates of ethylene, hydrogen and comonomer were controlled to maintain fixed composition targets, as indicated in Table 1 below. The ethylene concentration was controlled to maintain a constant ethylene partial pressure. The hydrogen was controlled to maintain a constant hydrogen-to-ethylene mole ratio. The concentration of all the gases was measured by an on-line gas chromatograph to ensure relatively constant composition in the recycle gas stream.

Catalyst A was injected directly into the fluidized bed using purified nitrogen as a carrier. Its rate was adjusted to maintain a constant production rate. The continuity additive was injected directly into the fluidized bed independently from Catalyst A using purified nitrogen as a carrier. The rate of the continuity additive was adjusted to maintain a constant continuity additive to product ratio. The reacting bed of growing polymer particles was maintained in a fluidized state by the continuous flow of the makeup feed and recycle gas through the reaction zone. A superficial gas velocity of 1-3 ft/sec was used to achieve this. The reactor was operated at a total pressure of about 300 psig. To maintain a constant reactor temperature, the temperature of the recycle gas was continuously adjusted up or down to accommodate any changes in the rate of heat generation due to the polymerization.

The fluidized bed was maintained at a constant height by withdrawing a portion of the bed at a rate equal to the rate of formation of particulate product. The product was removed semi-continuously via a series of valves into a fixed volume chamber, which was simultaneously vented back to the reactor. This allows for highly efficient removal of the product, while at the same time recycling a large portion of the unreacted gases back to the reactor. This product was purged to remove entrained hydrocarbons and treated with a small steam of humidified nitrogen to deactivate any trace quantities of residual catalyst.

Table 1 below provides the polymerization parameters for Example 1. The catalyst productivity for each run is also provided in Table 1.

TABLE 1

Polymerization Parameters for Runs 1-3

| Parameter | Units | Run 1 | Run 2 | Run 3 |
|---|---|---|---|---|
| Catalyst | n/a | A | A | A |
| Continuity Additive | n/a | CA-1 | CA-2 | CA-2 |
| Continuity Additive Loading | ppm | 30 | 15 | 30 |
| Continuity Additive Slurry | wt % | 20 | 10 | 10 |
| Residence Time | hours | 4.87 | 4.75 | 5.33 |
| $C_2$ Concentration | mole % | 62.9 | 62.8 | 63.0 |
| $C_2$ Partial Pressure | psia | 197 | 197 | 198 |
| $H_2$ Concentration | ppm | 288 | 285 | 290 |
| $H_2/C_2$ Analyzer Ratio | ppm/mole % | 4.58 | 4.54 | 4.60 |
| Hexene Concentration | mole % | 0.92 | 0.94 | 0.95 |
| $C_6/C_2$ Analyzer Ratio | n/a | 0.0146 | 0.0150 | 0.0150 |
| $C_2$ Feed | lb/hr | 171 | 165 | 155 |
| $IC_5$ | mole % | 3.5 | 3.6 | 3.6 |
| $N_2$ Concentration | mole % | 32.65 | 32.63 | 32.52 |
| Reactor Pressure | psia | 313.1 | 313.7 | 313.9 |
| Bed Temperature | °F. | 176.2 | 176.2 | 176.2 |
| Gas Velocity | ft/sec | 2.25 | 2.25 | 2.25 |
| Bed Weight | lbs | 714.3 | 717.7 | 720.2 |
| Bed Level | Ft | 13.8 | 13.8 | 13.5 |
| Fluidized Bed Density | lb/ft$^3$ | 18.79 | 18.89 | 19.32 |
| Cat Feed Rate | g/hr | 6.06 | 4.97 | 5.37 |
| Production Rate | lb/hr | 146.6 | 151.0 | 135.1 |
| Catalyst Productivity | g/g | 10988 | 13794 | 11423 |

As illustrated by Table 1 above, Catalyst A with 30 ppm of CA-1 gave 10,988 g/g productivity. Catalyst productivity increased to 11,423 g/g when using 30 ppm of CA-2 in Run 3. Catalyst productivity further increased to 13,794 g/g when the loading level of CA-2 was reduced to 15 ppm in Run 2.

The properties of the resin produced in each run of Example 1 were determined by the following test methods:
1. Melt Index ($I_2$): ASTM D-1238-04C at 190° C. with 2.16 kg;
2. High Load Melt Index ($I_{21}$): ASTM D-1238-04C at 190° C. with 21.6 kg
3. Density: ASTM D-105; and
4. Bulk Density: The resin was poured via a ⅞ inch diameter funnel into a fixed volume cylinder of 400 cc. The bulk density is measured as the weight of the resin divided by 400 cc to give a value in g/cc.

Table 2 below provides properties of the resins produced in Example 1.

TABLE 2

Resin Properties for Runs 1-3

| Resin Property | Units | Run 1 | Run 2 | Run 3 |
|---|---|---|---|---|
| Melt Index ($I_2$) | g/10 min | 0.99 | 0.97 | 1.00 |
| HLMI ($I_{21}$) | g/10 min | 26.82 | 27.39 | 29.81 |
| MFR ($I_{21}/I_2$) | n/a | 27.12 | 28.24 | 29.81 |
| Density | g/cc | 0.9176 | 0.9173 | 0.9175 |
| Bulk Density | g/cc | 0.4655 | 0.4715 | 0.4713 |

Example 2

Additional gas phase polymerizations were carried out in the pilot plant fluidized bed reactor from Example 1 to further evaluate the use of extracted metal carboxylates salts as a continuity additive. Table 3 identifies 4 different runs, along with the reported reaction conditions for each run. Also reported in Table 3 is the catalyst productivity. Table 4 identifies various properties of the resulting polymer product, including the resin bulk density.

The polymerization procedure for testing the extracted aluminum stearate for Example 2 is the same as that described and used above in Example 1. In Example 2, four runs were conducted using the continuous gas phase fluidized bed reactor. Run 4 used Catalyst C with CA-1 as the continuity additive. Run 5 used Catalyst D with CA-1 as the continuity additive. Run 6 used Catalyst D with CA-2 as the continuity additive. Run 7 used Catalyst C with CA-3 as the continuity additive.

Table 3 below provides the polymerization parameters for Example 2. The catalyst productivity for each run is also provided in Table 3.

TABLE 3

Polymerization Parameters for Runs 1-4

| Parameter | Units | Run 4 | Run 5 | Run 6 | Run 7 |
|---|---|---|---|---|---|
| Catalyst Compound | n/a | C | D | D | C |
| Slurry Continuity Additive | n/a | CA-1 | CA-1 | CA-2 | CA-3 |
| Continuity Additive Slurry Feed Rate | ppm | 30 | 30 | 30 | 30 |
| Continuity Additive Slurry Concentration | wt % | 10 | 10 | 10 | 10 |
| Residence Time | hours | 5.15 | 4.80 | 4.76 | 5.32 |
| $C_2$ Concentration | mole % | 64.1 | 63.8 | 64.1 | 64.6 |
| $C_2$ Partial Pressure | psia | 201 | 201 | 201 | 203 |
| $H_2$ Concentration | ppm | 757 | 771 | 776 | 787 |
| $H_2/C_2$ Analyzer Ratio | ppm/mole % | 11.81 | 12.08 | 12.12 | 12.18 |
| Hexene Concentration | mole % | 0.57 | 0.57 | 0.59 | 0.63 |
| $C_6/C_2$ Analyzer Ratio | n/a | 0.0090 | 0.0090 | 0.0093 | 0.0098 |
| $C_2$ Feed | lb/hr | 154 | 155 | 165 | 130 |
| $IC_5$ | mole % | 2.5 | 2.6 | 2.4 | 2.4 |
| $N_2$ Concentration | mole % | 32.72 | 32.96 | 32.83 | 32.32 |
| Reactor Pressure | psia | 314.2 | 314.3 | 313.8 | 314.4 |
| Bed Temperature | °F. | 184.2 | 184.3 | 183.8 | 183.3 |
| Gas Velocity | ft/sec | 2.25 | 2.25 | 2.25 | 2.25 |
| Bed Weight | lbs | 682.7 | 680.7 | 682.5 | 677.8 |
| Bed Level | Ft | 12.3 | 12.2 | 12.2 | 12.2 |
| Fluidized Bed Density | lb/ft³ | 20.22 | 20.40 | 20.18 | 20.25 |
| Cat Feed Rate | g/hr | 8.75 | 8.47 | 8.47 | 9.21 |
| Aluminum Stearate in Polymer | ppm | 28.4 | 26.6 | 31.8 | 35.8 |
| Production Rate | lb/hr | 132.5 | 141.7 | 143.5 | 127.5 |
| Catalyst Productivity | g/g | 6875 | 7592 | 7688 | 6285 |

As illustrated by Table 3 above, Catalyst C with CA-1 gave 6,875 g/g productivity in Run 4. Catalyst productivity increased to 7,592 g/g for Run 5 when Catalyst D, which was formulated with CA-2, was used with the same concentration of CA-1 added to the reactor. The highest productivity was observed for Run 6 where the catalyst was formulated with extracted CA-2 and CA-2 was also added as a continuity additive directly to the reactor. In particular, Catalyst D with CA-2 gave 7,688 g/g productivity in Run 6. Accordingly, this data indicates that catalyst productivity was increased when an extracted aluminum stearate was used either as part of the catalyst composition or introduced directly into the reactor independently of the catalyst composition with the most increase seen when the extracted aluminum stearate was used in the catalyst composition and also independently introduced into the reactor.

The properties of the resins produced in each run were determined using the test methods described above for the resin produced in Example 1. Table 4 below provides properties of the resin produced in Example 2.

TABLE 4

Resin Properties for Runs 1-3

| Resin Property | Units | Run 4 | Run 5 | Run 6 | Run 7 |
|---|---|---|---|---|---|
| Melt Index ($I_2$) | g/10 min | 0.66 | 0.77 | 0.83 | 0.76 |
| HLMI ($I_{21}$) | g/10 min | 25.56 | 28.78 | 30.42 | 27.32 |
| MFR ($I_{21}/I_2$) | n/a | 38.73 | 37.38 | 36.65 | 35.95 |
| Density | g/cc | 0.9195 | 0.9198 | 0.9197 | 0.9199 |
| Bulk Density | g/cc | 0.4713 | 0.4760 | 0.4818 | 0.4743 |

As illustrated by Table 4 above, the extraction of the aluminum stearate also provided increased resin settled bulk densities. In particular, the resin produced from Run 4 with Catalyst C and CA-1 had a bulk density of 0.4713 g/cc. However, increased bulk densities were observed for Runs 5-7. In particular, Run 5 where the catalyst was formulated with extracted aluminum stearate (CA-2), a bulk density of 0.4760 g/cc was observed. Increased bulk density (0.4743 g/cc) was also observed for Run 7 where extracted aluminum stearate (CA-3) was used as a continuity additive. However, the highest bulk density increase was observed for Run 6 where extracted aluminum stearate (CA-2) was used in the catalyst composition and also independently introduced into the reactor. As shown in Table 4, the bulk density for Run 6 was 0.4818 g/cc.

Example 3

The following example relates to gas phase polymerizations carried out in a pilot plant fluidized bed reactor, utilizing ethylene and hexane comonomers, to evaluate the use of a metallocene catalyst compound prepared by incipient wetness impregnation. Table 5 identifies 2 different runs, along with the reported reaction conditions for each run. Also reported in Table 5 is the catalyst productivity. Table 6 identifies various properties of the resulting product, including the resin bulk density.

The polymerization procedure for testing Catalysts E and F produced with incipient wetness impregnation is the same as that described above and used in Example 1. In Example 3, two runs were conducted using the continuous gas phase fluidized bed reactor. Run 8 used Catalyst E, and Run 9 used Catalyst F. Both Run 8 and Run 9 used CA-1.

Table 5 below provides the polymerization parameters for Example 3. The catalyst productivity for each run is also provided in Table 5.

TABLE 5

Polymerization Parameters for Runs 8-9

| Parameter | Units | Run 8 | Run 9 |
|---|---|---|---|
| Catalyst | n/a | E | F |
| Continuity Additive | n/a | CA-1 | CA-1 |
| Continuity Additive Loading | ppm | 30 | 30 |

TABLE 5-continued

Polymerization Parameters for Runs 8-9

| Parameter | Units | Run 8 | Run 9 |
|---|---|---|---|
| Continuity Additive Slurry | wt % | 20 | 20 |
| Residence Time | hours | 4.48 | 4.55 |
| $C_2$ Concentration | mole % | 63.0 | 63.1 |
| $C_2$ Partial Pressure | psia | 198 | 198 |
| $H_2$ Concentration | ppm | 290 | 292 |
| $H_2/C_2$ Analyzer Ratio | ppm/mole % | 4.60 | 4.63 |
| Hexene Concentration | mole % | 0.79 | 0.78 |
| $C_6/C_2$ Analyzer Ratio | n/a | 0.0126 | 0.0123 |
| $C_2$ Feed | lb/hr | 166 | 159 |
| $IC_5$ | mole % | 3.7 | 3.6 |
| $N_2$ Concentration | mole % | 32.49 | 32.53 |
| Reactor Pressure | psia | 314.6 | 314.6 |
| Bed Temperature | ° F. | 176.1 | 176.1 |
| Gas Velocity | ft/sec | 2.25 | 2.25 |
| Bed Weight | lbs | 639.4 | 632.5 |
| Bed Level | Ft | 11.9 | 13.1 |
| Fluidized Bed Density | lb/ft$^3$ | 19.54 | 17.57 |
| Cat Feed Rate | g/hr | 4.33 | 5.48 |
| Production Rate | lb/hr | 142.7 | 138.9 |
| Catalyst Productivity | g/g | 14974 | 11507 |

As illustrated by Table 5 above, both Catalyst E and F prepared as described above with incipient wetness impregnation provided increased catalyst productivity as compared to Run 1 from Example 1. Run 1 utilized Catalyst A which did not utilize incipient wetness impregnation. In particular, Catalyst E gave 14,974 g/g productivity in Run 8, and Catalyst F gave 11,507 productivity in Run 9 while Catalyst A in Run 1 gave only 10,988 g/g productivity. Accordingly, this data indicates that catalyst productivity can be enhanced when the catalyst composition is deposited on the support using incipient wetness impregnation.

The properties of the resins produced in each run of Example 3 were measured with the same test methods described above for the resin produced in Example 1. Table 6 below provides properties of the resin produced in Example 3.

TABLE 6

Resin Properties for Runs 8-9

| Resin Property | Units | Run 8 | Run 9 |
|---|---|---|---|
| Melt Index ($I_2$) | g/10 min | 1.03 | 0.93 |
| HLMI ($I_{21}$) | g/10 min | 22.99 | 19.93 |
| MFR ($I_{21}/I_2$) | n/a | 22.32 | 21.48 |
| Density | g/cc | 0.9174 | 0.9158 |
| Bulk Density | g/cc | 0.4420 | 0.3988 |

Only certain ranges are explicitly disclosed herein, however, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

While the invention has been described with respect to a number of embodiments and examples, those skilled in the art, having benefit of this disclosure, will appreciate that other embodiments can be devised which do not depart from the scope and spirit of the invention as disclosed herein. Although individual embodiments are discussed, the invention covers all combinations of all those embodiments.

All documents cited herein are incorporated by reference for all jurisdictions in which such incorporation is permitted and to the extent such disclosure is consistent with the description of the present invention.

What is claimed is:

1. A polymerization process comprising: polymerizing an olefin in a reactor in the presence of a catalyst composition and an extracted metal carboxylate salt, wherein the extracted metal carboxylate salt was produced by extraction of a metal carboxylate salt with an organic solvent having a dielectric constant at 25° C. of greater than or equal to 3.0.

2. The process of claim 1 wherein the extracted metal carboxylate salt is essentially free of free carboxylic acids.

3. The process of claim 1, wherein the extracted metal carboxylate salt contains less than 1 wt % of total free acid based on the total weight of the extracted metal carboxylate salt.

4. The process of claim 1, wherein the organic solvent is selected from the group consisting of a $C_1$-$C_{10}$ alcohol, a $C_1$-$C_{10}$ ketone, a $C_1$-$C_{10}$ ester, a $C_1$-$C_{10}$ ether, a $C_1$-$C_{10}$ alkyl halide, a $C_1$-$C_{10}$ alkylonitrile, a $C_1$-$C_{10}$ dialkyl sulfoxide, and combinations thereof.

5. The process of claim 1, wherein the metal carboxylate salt is represented by the formula:

$$MQx(OOCR)y$$

where M is a Group 13 metal from the Periodic Table of Elements;

Q is a halogen, hydroxy, alkyl, alkoxy, aryloxy, siloxy, silane or sulfonate group;

R is a hydrocarbyl radical having from 12 to 30 carbon atoms;

x is an integer from 0 to 3;

y is an integer from 1 to 4; and the sum of x and y is equal to the valence of the metal M.

6. The process of claim 1, wherein the extracted metal carboxylate salt comprises an aluminum carboxylate.

7. The process of claim 1, wherein the metal carboxylate salt comprises an aluminum stearate selected from the group consisting of an aluminum mono-stearate, an aluminum di-stearate, an aluminum tri-stearate, and combinations thereof.

8. The process of claim 1, further comprising adding a continuity additive comprising the extracted metal carboxylate salt into the reactor, wherein the continuity additive and the catalyst composition are added to the reactor separately.

9. The process of claim 1, further comprising adding the catalyst compound to the reactor in combination with a continuity additive comprising the extracted metal carboxylate salt.

10. The process of claim 1, wherein the catalyst composition further comprises a support, and wherein the catalyst compound is a metallocene catalyst compound, and wherein the metallocene catalyst compound and the support are combined utilizing incipient wetness impregnation.

11. The process of claim 1, wherein the catalyst composition further comprises a support and an activator, and wherein the catalyst compound is a metallocene catalyst compound comprising at least one atom selected from the group consisting of a titanium atom, a zirconium atom, and a hafnium atom.

12. The process of claim 1, wherein the catalyst compound is a metallocene compound, and wherein the metallocene compound is selected from the group consisting of (Pentamethylcyclopentadienyl) (Propyl cyclopentadienyl) $MX_2$, Tetramethylcyclopentadienyl) (Propyl cyclopentadienyl) $MX_2$, (Tetramethylcyclopentadienyl) (Butyl cyclopentadienyl) $MX_2$, $Me_2Si(Indenyl)_2MX_2$, $Me_2Si(Tetrahydroindenyl)_2$ $MX_2$, (n-propyl cyclopentadienyl)$_2$ $MX_2$, (n-butyl cyclopentadienyl)$_2$ $MX_2$, (1-Methyl, 3-Butyl cyclopentadienyl)$_2$ $MX_2$, HN(CH$_2$CH$_2$N(2,4,6-Me3-Phenyl))$_2$ MX$_2$, HN(CH$_2$CH$_2$N(2,3,4,5,6-Me$_5$-Phenyl))$_2$ MX$_2$, (Propyl cyclopentadienyl)(Tetramethylcyclopentadienyl) MX$_2$, (Butyl cyclopentadienyl)$_2$ MX$_2$, (Propyl cyclopentadienyl)$_2$ MX$_2$, and combinations thereof, wherein M is Zr or Hf, and X is selected from the group consisting of F, Cl, Br, I, Me, Bnz, CH$_2$SiMe$_3$, C1 to C5 alkyls, and C1 to C5 alkenyls.

13. The process of claim 1, wherein the catalyst composition comprises a support and an activator, and wherein the catalyst compound is a metallocene catalyst compound selected from (1-Methyl, 3-Butyl cyclopentadienyl)$_2$ ZrX$_2$, where X is selected from the group consisting of F, Cl, Br, I, and Me.

14. The process of claim 1, wherein the catalyst composition comprises a metallocene catalyst compound and at least one other catalyst compound selected from a Ziegler-Natta catalyst, a chromium-based catalyst, a metallocene catalyst, a Group-15 catalyst, and combinations thereof.

15. The process of claim 1, wherein the process has increased catalyst productivity versus the same process except that the metal carboxylate salt has not been extracted.

16. A polymer product comprising a polyolefin produced by the process of claim 1.

17. The polymer of claim 16 wherein the polymer has increased resin bulk density versus a polymer produced by the same process except that the metal carboxylate salt has not been extracted.

18. A polymerization process for the production of an ethylene alpha-olefin copolymer, the polymerization process comprising:
contacting ethylene and an alpha-olefin with a catalyst composition in a reactor under polymerization conditions to produce the ethylene alpha-olefin copolymer, wherein the catalyst composition comprises a polymerization catalyst and a first extracted metal carboxylate salt, wherein the first extracted metal carboxylate salt was produced by extraction of a metal carboxylate salt with an organic solvent having a dielectric constant at 25° C. of greater than or equal to 3.0; and
adding a continuity additive comprising a second extracted metal carboxylate salt into the reactor, wherein the continuity additive and the catalyst composition are added to the reactor separately, wherein the second extracted metal carboxylate salt was produced by extraction of a metal carboxylate salt with an organic solvent having a dielectric constant at 25° C. of greater than or equal to 3.0.

19. The process of claim 18, wherein the first extracted metal carboxylate salt and the second extracted metal carboxylate salt are each essentially free of free carboxylic acids.

20. The process of claim 18, wherein the metal carboxylate salts extracted to produce the first and second extracted metal carboxylate salts are independently selected from aluminum mono-stearate, an aluminum di-stearate, an aluminum tri-stearate, and combinations thereof.

* * * * *